(12) United States Patent
Endo

(10) Patent No.: US 6,733,816 B2
(45) Date of Patent: May 11, 2004

(54) HEALTHY DRINK MADE FROM AZUKI BEANS AND ITS PRODUCTION METHOD

(75) Inventor: Kiyoji Endo, Tokyo (JP)

(73) Assignee: Kabushiki Kaisha Erndoseian, Tokyo (JP)

( * ) Notice: Subject to any disclaimer, the term of this patent is extended or adjusted under 35 U.S.C. 154(b) by 266 days.

(21) Appl. No.: 09/963,462

(22) Filed: Sep. 27, 2001

(65) Prior Publication Data

US 2002/0068124 A1 Jun. 6, 2002

(30) Foreign Application Priority Data

Dec. 5, 2000 (JP) .................................. 2000-370337

(51) Int. Cl.[7] .............................. A23L 2/04; A23L 2/10
(52) U.S. Cl. .................... 426/634; 426/507; 426/508; 426/615
(58) Field of Search .................... 426/508, 507, 426/615, 634

(56) References Cited

FOREIGN PATENT DOCUMENTS

| JP | 57-180592 | 11/1956 |
|----|-----------|---------|
| JP | 1118738 | 1/1999 |
| JP | 2000189123 | 7/2000 |

*Primary Examiner*—Helen Pratt
(74) *Attorney, Agent, or Firm*—Dykema Gossett PLLC

(57) ABSTRACT

The object of the present invention is to provide a new healthy drink effectively utilizing azuki bean which is rich in mineral components and polyphenol components, and its production method. Washing a desired amount of azuki beans and extracting them under a certain heating condition to obtain an extracted liquid containing minerals and polyphenols from azuki bean, diluting the extracted liquid for adjusting concentration and filling it up in a closed container, heating and cooling the liquid in the closed container, followed by aging, to obtain a healthy drink containing sodium, calcium, magnesium, potassium, iron, tannin originated from azuki bean.

7 Claims, 2 Drawing Sheets

Fig. 2

| Item | sex | Age | | | |
|---|---|---|---|---|---|
| | | 21 – 30 | 31 – 40 | 41 – 50 | 51 – 60 |
| Color | male | 3.0 | 4.0 | 3.3 | 4.0 |
| | female | 4.2 | 5.0 | 3.8 | 3.6 |
| Fragrance | male | 2.5 | 3.0 | 3.5 | 3.0 |
| | female | 3.2 | 2.7 | 2.6 | 2.8 |
| Taste | male | 2.5 | 3.0 | 3.0 | 4.0 |
| | female | 3.4 | 3.7 | 3.2 | 3.4 |
| Bitterness | male | 3.0 | 4.0 | 3.5 | 3.0 |
| | female | 4.0 | 3.7 | 2.0 | 3.0 |

Fig. 3

| Item | Comparative Example 1 | Comparative Example 2 | Comparative Example 3 | Example |
|---|---|---|---|---|
| Energy: (kcal/100mg) | 0 | 0 | 0 | 1 |
| Protein: (g/100ml) | 0 | 0 | 0 | – |
| Fat: (g/100ml) | 0 | 0 | 0 | – |
| Sugar: (g/100ml) | 0 | 0 | 0 | 0.2 |
| Sodium : (mg/100ml) | 0.50 | 0.49 | 1.69 | 0.80 |
| Calcium : (mg/100ml) | 7.80 | 0.97 | 0.52 | 1.30 |
| Magnesium : (mg/100ml) | 2.40 | 0.14 | 2.51 | 1.60 |
| Potassium : (mg/100ml) | – | 0.28 | 0.04 | 16.30 |
| Iron : (mg/100ml) | – | – | – | 0.03 |
| Tannin : (mg/100ml) | – | – | – | 30.00 |
| pH | – | – | 7.4 | – |
| Hardness : (mg/l) | – | 30 | 84 | – |

HEALTHY DRINK MADE FROM AZUKI BEANS AND ITS PRODUCTION METHOD

BACKGROUND OF THE INVENTION

1. Field of the Invention

This invention relates to a healthy drink containing mineral components such as sodium, calcium, magnesium, potassium, iron and tannin, and polyphenol components contained in azuki bean, while containing a small amount of energy sources such as sugar, fat and protein, and its production method.

2. Description of the Related Art

Heretofore, azuki bean is known as nutritious bean containing energy sources such as sugar, fat, and protein, and is used as a raw material for production of azuki-bean soup (Shiruko), bean jam, sweet jelly of beans (Yokan) etc.

On the other hand, recently, by changing life environments and eating habits, increase of the diseases from life habits such as increase of fats, arteriosclerosis, high blood pressure and diabetes, caused by excessive caloric intake, became a social concern. Therefore, as a solution, much attention is paid on the so-called healthy drink which can easily provide vitamins and minerals with a low calorie content.

As such a healthy drink, drinks made from beans such as soy bean, black soy bean and azuki bean which contain vegetable protein, various vitamins, fats and minerals, providing a well balanced nutrition have been proposed (e.g. see publication of Japanese Patent Laid-Open H11-183738, H2000-189123).

However, those drinks from beans proposed heretofore are inclined rather to use as an alternative of coffee as table luxuries, and use black soy bean as an indispensable material, while using azuki bean only as a supplemental ingredient for sweet and flavor.

SUMMARY OF THE INVENTION

The present invention, considering above situation, aims for providing a new healthy drink effectively utilizing azuki bean (small red bean) which is rich in mineral components such as sodium, calcium, magnesium, potassium, iron and tannin, as well as polyphenol components, and its production method.

The inventors of the present invention, as a result of an intensive study placing focus on azuki bean which is rich in mineral components such as sodium, calcium, magnesium, potassium, iron, tannin and polyphenol components, found that a new healthy drink with a brilliant red color of azuki bean and a plain flavor can be produced by extracting effectively mineral and polyphenol components through heating azuki bean under a certain condition while limiting extraction of sugar, fat and protein, and further removing an astringency from extracted liquid which contains minerals and polyphenols by aging the extract under a suitable condition, thus completing the present invention.

Namely, the healthy drink made from azuki bean of the present invention is characterized by containing the extracted components of azuki bean, and the extracted components are essentially mineral components such as sodium, calcium, magnesium, potassium, iron, tannin and polyphenol components.

Function of each of above mentioned components contained in the healthy drink of the present invention are described in the following:

[Sodium]
mitigates excitement of muscles and nerves, maintains constant osmotic pressure of extracellular fluid such as plasma, maintains alkaline condition of body, helps secretion of digestive fluid, and prevents lack of appetite, fatigue, and mental unstability.

[Calcium]
forms hard texture such as bone and tooth, make blood alkaline affecting on the blood coagulation, and promotes contraction of cardiac muscle.

[Magnesium]
enhances stimulus excitement of muscle, while on the other hand sedates the same. Activates some kind of enzyme, helps prevention of cardiopalmus caused by vasodilation.

[Potassium]
controls function of heart and muscles, as well as maintains osmotic pressure of intracellular fluid, prevents myasthenia due to decrease of myodynamia and isles, prevents cystectacy, prevents parareflexia, improves allergic habit of body, helps intracorporeal spodophorous. With sodium, controls intracorporeal water balance and maintains normal heart beat rhythm.

[Iron]
carries oxygen via hemoglobin in red corpuscle as well as takes oxygen in blood into cells via myoglobin of liver. Distributed widely in cells of whole body, involved in activation of oxygen and promotes combustion of nutrients. Prevents anemia, fatigue, and hypoplasia of baby.

[Tannin]
has anti-oxidation effect, suppresses lipoperoxide, and carcinogenesis.

In order to make those functions effectively demonstrated, and to provide a suitable flavor and fragrance as a drink at the same time, the preferred range of content for each component, per 100 ml drink, are as follows: 0.5–1 mg sodium, 1–2 mg calcium, 1–2 mg magnesium, 10–20 mg potassium, 0.01–0.05 mg iron, and 25–35 mg tannin. Beyond those ranges, the drink becomes too much astringent and the functions of each component may not be demonstrated.

Particularly preferred contents are as follows: 0.8 mg sodium, 1.3 mg calcium, 1.6 mg magnesium, 16 mg potassium, 0.03 mg iron, and 30.0 mg tannin, whereby the function of each component is fully demonstrated with a suitable flavor and fragrance of a drink.

Quality of azuki beans, however, generally depends on its bleeding, growing district, harvest year and storage method. In addition, the bean changes its seed ratio (the ratio of its peel to the rest part) by self-decomposition of starch and protein to maintain its own life. Considering such characteristics peculiar to azuki bean, for production of the healthy drink made from azuki bean of the present invention, the inventors of the present invention intensively studied the method of preventing effluence of a component having relatively long molecular chain which has strong astringency and a bitter taste, and as the result, found that after extraction of minerals and polyphenols from azuki bean, subjecting the extract to heating process provides a mellow flavor by bonding relatively short molecular chains of the components of astringency and bitter taste, and furthermore, by aging for a certain period of time after the heating process, its flavor and fragrance become stabilized and suitable as a drink, thus completing the present invention.

Namely, as a preferred production method of the healthy drink made from azuki bean, a method is proposed comprising first washing the desired amount of azuki beans, followed by extraction of the beans under a certain heating condition to obtain an extracted liquid containing minerals and polyphenols from azuki bean, and after dilution of the extracted liquid to a certain concentration, the diluted liquid is filled up in a container which is then heated and cooled and left for aging.

Extraction in the above mentioned method is preferably conducted by boiling down process using 80–100° C. hot water for 20–60 minute. Under this condition, mineral components and polyphenol components in azuki bean are efficiently extracted while the extraction of sugars, fats and proteins are prevented.

For effectively demonstrating the function of each component and providing flavor and fragrance suited as a drink, it is preferred to adjust dilution of the aforementioned extracted liquid as follows; sodium: 0.5–1 mg/100 ml, calcium: 1–2 mg/100 ml, magnesium: 1–2 mg/100 ml, potassium: 10–20 mg/100 ml, iron: 0.01–0.05 mg/100 ml, tannin: 25–35 mg/100 ml.

Heating of the closed container in the above mentioned method is preferably conducted at 110–130° C. for a period of 30–40 minutes. This condition develops color in the liquid in the container and remove astringency to provide a flavor suited for drink.

Aging in the closed container in the above mentioned method is preferably conducted at 15–30° C. for a period of 3–7 days. Under this condition, color of the liquid in the container further deepens and flavor is improved, thus providing taste, fragrance and color suited for drink.

The production method of the healthy drink made from azuki bean of the present invention is further proposed comprising first washing a desired amount of azuki beans, followed by extraction of the beans using 80–100° C. hot water for a period of 30–60 minutes for extracting mineral components and polyphenol components from azuki bean, and then heating the diluted extract at 120–135° C. for a period of 5–40 minutes to develop color and flavor of the diluted extract, followed by cooling and filling it up in a container sealed hermetically, and aging at 15–30° C. for a period of further 3–7 days for deepening the color of the liquid in the container and stabilizing the flavor.

BRIEF DESCRIPTION OF THE DRAWINGS

FIG. 2 shows the result of the sensual tests for color, fragrance, taste and bitter taste of the healthy drink of the present invention.

FIG. 3 shows a comparison of the contained components in the healthy drink of the present invention and in a mineral water in the market.

DESCRIPTION OF THE PREFERRED EMBODIMENTS

The present invention related to a healthy drink made from azuki bean and its production method is illustrated in more detail by reference to the following examples.

Figure 1:
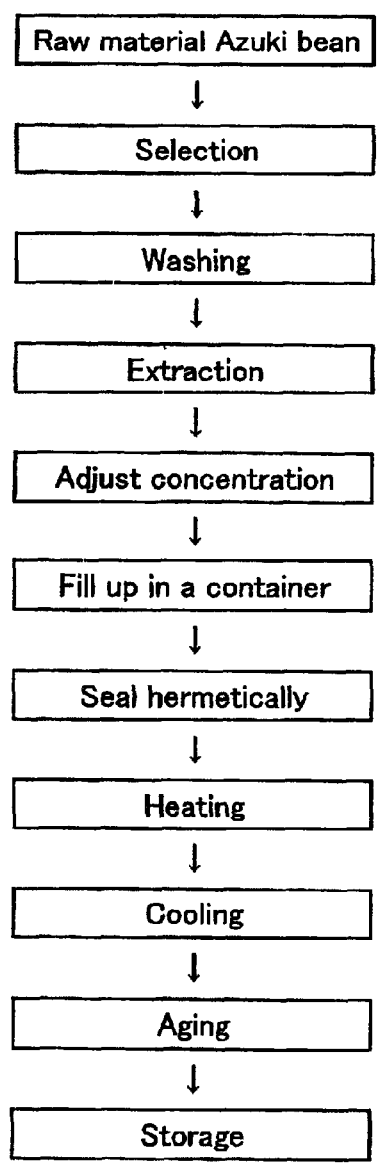
FIG. 1 shows a block flow diagram of an example of the production method of the present invention.

Example 1 as shown in FIG. 1 will be described as follows. Although any azuki bean for food use can be used in the present invention, "Hokkai Azuki" was used in this example.

30 kg of this azuki beans having good color and shape were selected, washed with water, and thrown into 300 kg of water in a pot-like container where the beans were boiled at 80–100° C. for 20–60 minutes, preferably at 90–100° C. for 30–60 minutes, and an extracted liquid containing mineral components and polyphenol components was obtained wherein the extraction of sugars, fats and proteins were suppressed.

After removing unnecessary components such as fibrous tissues, the extract was diluted with water to contain sodium: 0.8 mg/100 ml, calcium: 1.3 mg/100 ml, magnesium: 1.6 mg/100 ml, potassium: 16.3 mg/100 ml, iron 0.03 mg/100 ml, tannin: 30.0 mg/100 ml, sugar: 0.2 g/100 ml, while containing almost no fats and proteins.

This adjusted liquid was filled up in a sealed container and heated at 110–130° C. for 30–45 minutes, preferably at 125° C. for 35–40 minutes. By this heating, the liquid in the container developed red color of azuki, and astringency was removed so that a flavor of a drink was generated.

Next, the above container was cooled by water for 15–20 minutes, and then subjected to aging at room temperature (15–30° C.) for 3–7 days. By this aging, the liquid in the container further deepened the red color of azuki bean as well as its flavor and fragrance were stabilized making it suitable as a drink.

The drink thus obtained contained sodium: 0.8 mg/100 ml, calcium: 1.3 mg/100 ml, magnesium: 1.6 mg/100 ml, potassium: 16.3 mg/100 ml, iron: 0.03 mg/100 ml, tannin: 30.0 mg/100 ml, while containing 0.2 g/100 ml of sugars and almost no fats and proteins, providing a new healthy drink containing mineral components and polyphenol components from azuki bean and almost without sugars, fats and proteins with a brilliant red color originated from azuki bean.

A trial drinking of thus obtained healthy drink by 30 men and women of 20–60 years of age was conducted for evaluation of four items, namely, its color, fragrance, taste and bitter taste, the result of which is shown in FIG. 2. Evaluation method was a numerical marking with respect to each of four items of color, fragrance, taste and bitter taste, giving 1 point for bad, 2 points for more or less bad, 3 points for ordinal, 4 points for more or less good and 5 points for good, and the average points were marked as evaluation point in the table.

As a result of this evaluation test, irrespective of age and sex, average points of 3 or more was marked for color, fragrance, taste and bitter taste.

On the other hand, the samples with less and more contents of each components than those as designated in the present invention (potassium: 10–20 mg/100 ml, iron: 0.01–0.05 mg/100 ml, tannin: 25–35 mg/100 ml, sodium: 0.5–1 mg/100 ml, calcium: 1–2 mg/100 ml, magnesium: 1–2 mg/100 ml) were prepared and subjected to the same evaluation test as described above. As the result, inferior evaluation points than those marked in FIG. 2 were obtained.

FIG. 3 shows a comparison of the components contained in the healthy drink (Example) of the present invention and those in a mineral water (Comparative Examples 1–3) available in the market. From this comparison it is shown that although the mineral water in the market contains sodium, calcium, magnesium, it contains less or no potassium, iron and tannin, indicating that the effect of the healthy drink of the present invention is not obtained.

Figure 4:
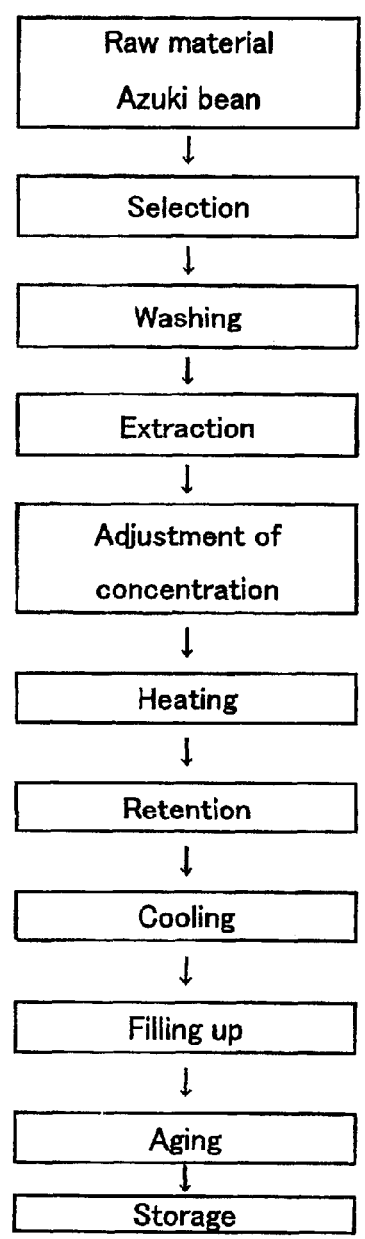
FIG. 4 shows a block flow diagram of another example of the production method of the present invention.

Example 2 shown in FIG. 4 will be explained next in detail. In this example, an extract was obtained from azuki beans in the same manner as described in Example 1, and the extract was diluted to give an adjusted liquid containing sodium: 0.8 mg/100 ml, calcium: 1.3 mg/100 ml, magnesium: 1.6 mg/100 ml, potassium: 16.3 mg/100 ml, iron: 0.03 mg/100 ml, tannin: 30.0 mg/100 ml, sugar: 0.2 g/100 ml, with almost no fats and proteins.

Then the liquid was heated at 120–135° C. and, after that, kept for 5–40 minutes. By this heating and keeping, the liquid developed red color of azuki bean and astringency was removed, providing a flavor suited as a drink.

After cooling the liquid, it was filled up in a can as a container for drink and sealed hermetically, followed by aging at 15–30° C. for further 3–7 days. By this aging, red color of azuki bean was deepened, flavor and fragrance were stabilized in the canned liquid, which thus became suitable for drink.

The drink in the container thus obtained, same as the Example 1, contained efficiently the mineral components and polyphenol components from azuki bean, while sugars, fats and proteins were suppressed as much as possible, providing a new drink with a brilliant red color originated from azuki bean.

With the healthy drink of this example, evaluation was made also for color, fragrance, taste and bitter taste, in the same manner as described in Example 1, and obtained the same result as in Example 1.

The preferred embodiments of the present invention related to a healthy drink and its production method are described with examples as above. However, the present invention is not limited to those examples, and variations are possible within the technical concepts.

Moreover, the healthy drink of the present invention can be used, not only for a drink, but also as a cooking water for making breads, noodles, rice, Japanese cakes, cakes, household cooked dishes and so on.

Furthermore, using the healthy drink of the present invention as a base component, a healthy drink can be prepared by adding effective components extracted from soy beans and other beans or other minerals, vitamins and polyphenols.

It is obvious that the production method for the healthy drink of the present invention is not limited to those described above, but also applied to various forms of the product such as diluted drinks if desired by consumer, or processing the extracted liquid to a powder or particles for an instant drink, by employing corresponding production methods, starting from washing, heating, extraction of minerals and polyphenols from azuki bean under a certain conditions and adjusting concentration of the components.

The healthy drink of the present invention, as described above, is a new drink containing mineral components contained in azuki bean such as sodium, calcium, magnesium, potassium, iron, tannin and polyphenol components, while inclusion of sugars, fats and proteins are suppressed as far as possible, which significantly contributes for promotion of health and for improvement of diet of the today's people by easy ingestion of various minerals and polyphenols while minimizing calorific intake. In addition, it is a new and easy drink as it brings about a mellow flavor originated from sweetness of azuki bean and red color thus having a high commercial value accepted by a wide range of customers regardless of age and sex.

It has many advantages such as controlling function of heart and muscles, improving allergic habit of body, intracorporeal spodophorous, preventing anemia and fatigue, suppression of carcinogenesis etc., as it contains especially potassium, iron, and tannin.

The production method related to the present invention enables to obtain the healthy drink having above mentioned effects in a simple way and in a short time, and is suitable especially for mass production of a canned drink.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A method of producing a healthy drink from azuki beans which comprises the steps of
   (a) washing a plurality of azuki beans,
   (b) extracting said washed azuki beans with water to obtain an extracted liquid which contains mineral and polyphenol components,
   (c) diluting said extracted liquid with water to provide an adjusted liquid,
   (d) placing said adjusted liquid in a sealed container,
   (e) heating said sealed container to a temperature of 110 to 130° C. for 30 to 40 minutes to develop color in the adjusted liquid therein and remove astringency,
   (f) cooling said sealed container, and
   (g) aging the sealed container to provide the healthy drink therein.

2. The method according to claim 1, wherein the adjusted liquid provided in step (c) includes, per 100 ml of adjusted liquid, 0.5 to 1 mg sodium, 1 to 2 mg calcium, 1 to 2 mg magnesium, 10 to 20 mg potassium, 0.01 to 0.05 mg iron, and 25 to 35 mg tannin.

3. A healthy drink made by the method of claim 2.

4. A healthy drink made by the method of claim 1.

5. A method of producing a healthy drink from azuki beans which comprises the steps of
   (a) washing a plurality of azuki beans,
   (b) extracting said washed azuki beans with water to obtain an extracted liquid which contains mineral and polyphenol components,
   (c) diluting said extracted liquid with water to provide an adjusted liquid,
   (d) placing said adjusted liquid in a sealed container,
   (e) heating said sealed container,
   (f) cooling said sealed container, and
   (g) maintaining said sealed container at 15 to 30° C. for 3 to 7 days to age the adjusted liquid therein and deepen color and flavor thereof.

6. The method according to claim 5, wherein the adjusted liquid provided in step (c) includes, per 100 ml of adjusted liquid, 0.5 to 1 mg sodium, 1 to 2 mg calcium, 1 to 2 mg magnesium, 10 to 20 mg potassium, 0.01 to 0.05 mg iron, and 25 to 35 mg tannin.

7. A method of producing a healthy drink from azuki beans which comprises the steps of
   (a) washing a plurality of azuki beans,
   (b) extracting said azuki beans by contact with hot water at 80 to 100° C. for 20 to 60 minutes to provide an extracted liquid which contains mineral and polyphenol components,
   (c) diluting said extracted liquid with water to provide an adjusted liquid,
   (d) heating said adjusted liquid to 120 to 135° C.,
   (e) aging the adjusted liquid for 5 to 40 minutes to develop color and flavor,
   (f) cooling the adjusted liquid,
   (g) placing said adjusted liquid in a sealed container, and
   (h) aging the adjusted liquid in the sealed container by subjecting said sealed container to a temperature of 15 to 30° C. for 3 to 7 days to deepen and stabilize the color and flavor thereof.

* * * * *